US012803267B2

(12) United States Patent
Han et al.

(10) Patent No.: US 12,803,267 B2
(45) Date of Patent: Nov. 17, 2026

(54) POWER SUPPLY DEVICE

(71) Applicant: CHICONY POWER TECHNOLOGY CO., LTD., New Taipei City (TW)

(72) Inventors: Chang-Lin Han, New Taipei City (TW); Shun-Hsu Yang, New Taipei City (TW)

(73) Assignee: CHICONY POWER TECHNOLOGY CO., LTD., New Taipei City (TW)

( * ) Notice: Subject to any disclaimer, the term of this patent is extended or adjusted under 35 U.S.C. 154(b) by 173 days.

(21) Appl. No.: 19/020,147

(22) Filed: Jan. 14, 2025

(65) Prior Publication Data

US 2026/0074506 A1 Mar. 12, 2026

(30) Foreign Application Priority Data

Sep. 9, 2024 (TW) ................................ 113134129

(51) Int. Cl.
*H02H 3/20* (2006.01)
*H02H 1/00* (2006.01)

(52) U.S. Cl.
CPC ............ *H02H 3/20* (2013.01); *H02H 1/0007* (2013.01)

(58) Field of Classification Search
CPC .......... H02H 3/20; H02H 1/00; H02H 1/0007; H02H 5/08; H02H 3/202
USPC ........................................................... 361/86
See application file for complete search history.

(56) References Cited

U.S. PATENT DOCUMENTS

| | | | | |
|---|---|---|---|---|
| 2019/0181590 | A1 | 6/2019 | Bae et al. | |
| 2020/0153256 | A1* | 5/2020 | Park | G01R 31/52 |
| 2022/0077697 | A1* | 3/2022 | Takichi | G06F 1/26 |
| 2023/0198243 | A1 | 6/2023 | Guo et al. | |

FOREIGN PATENT DOCUMENTS

| | | | |
|---|---|---|---|
| CN | 111007321 | A | 4/2020 |
| CN | 111443625 | A | 7/2020 |
| CN | 113359190 | A | 9/2021 |
| CN | 109212612 | B | 7/2022 |
| CN | 114264423 | B | 7/2022 |
| CN | 117348089 | A | 1/2024 |
| TW | M548792 | U | 9/2017 |
| TW | 201907302 | A | 2/2019 |

* cited by examiner

*Primary Examiner* — Danny Nguyen
(74) *Attorney, Agent, or Firm* — MUNCY, GEISSLER, OLDS & LOWE, P.C.

(57) ABSTRACT

A power supply device includes a Type-C connection port, a controller, a first resistor, a second resistor, a detection switch, and a power-supply switch. The Type-C connection port includes a channel configuration pin, a sideband use pin, and a power-output pin. The controller controls the detection switch to be turned on so that a work voltage is provided to the second resistor and the first resistor to detect a first voltage between the sideband use pin and a ground terminal and detect a second voltage between the channel configuration pin and the ground terminal. The controller turns on or turns off the power-supply switch according to the first voltage and the second voltage to control whether a power-supply voltage is transmitted to the power-output pin.

16 Claims, 9 Drawing Sheets

POWER SUPPLY DEVICE

BACKGROUND

Technical Field

The present disclosure relates to a power supply device, and more particularly to a power supply device that can detect whether a liquid is attached to pins of a connector thereof.

Description of Related Art

The statements in this section merely provide background information related to the present disclosure and do not necessarily constitute prior art.

With the release of the USB PD 3.1 fast charging standard, the charging power has been increased from the original 100 W to 240 W, and supports a maximum voltage output of 48V (that is, the output voltage is increased from the original 20V to the maximum of 48V), which also means that voltages cross pins of the USB Type-C connection port are larger. If there is foreign matter between the pins forming impedance at this time (water, dust or other objects or fluids with an impedance lower than air), the current generated by high voltage will greatly accelerate the corrosion or oxidation of the pins, resulting in high impedance of the pins. If the user continues to use it without paying attention at this time, there may be a risk of melting damage to the joint or even a fire.

Therefore, how to design a power supply device to solve the problems and technical bottlenecks in the existing technology has become a critical topic in this field.

SUMMARY

An objective of the present disclosure is to provide a power supply device, and the power supply device includes a Type-C connection port, a controller, a first resistor, a second resistor, a detection switch, and a power-supply switch. The Type-C connection port includes a channel configuration pin, a sideband use pin, and a power-output pin. The controller is coupled to the channel configuration pin through a first path, and coupled to the sideband use pin through a second path. The first resistor is coupled to the sideband use pin through the second path. The second resistor is coupled to the channel configuration pin and the sideband use pin through the first path and the second path respectively. The detection switch is coupled between the controller and the channel configuration pin and the sideband use pin through the second resistor, and the detection switch receives a work voltage. The power-supply switch is coupled to the power-output pin, and the power-supply switch receives a power-supply voltage. The controller controls the detection switch to be turned on so that the work voltage is provided to the second resistor and the first resistor to detect a first voltage between the sideband use pin and a ground terminal and detect a second voltage between the channel configuration pin and the ground terminal. The controller turns on or turns off the power-supply switch according to the first voltage and the second voltage to control whether the power-supply voltage is transmitted to the power-output pin.

In one embodiment, when the first voltage is less than a first lower threshold value, the controller turns off the power-supply switch so that the power-supply voltage cannot be transmitted to the power-output pin. When the first voltage is greater than the first lower threshold value, the controller turns on the power-supply switch so that the power-supply voltage is transmitted to the power-output pin.

In one embodiment, when the second voltage is less than a second lower threshold value, the controller turns off the power-supply switch so that the power-supply voltage cannot be transmitted to the power-output pin. When the second voltage is greater than the second lower threshold value, the controller turns on the power-supply switch so that the power-supply voltage is transmitted to the power-output pin.

In one embodiment, when a liquid having an equivalent resistance is attached on the sideband use pin, the first voltage acquired by dividing the work voltage according to the equivalent resistance, the first resistor, and the second resistor is less than the first lower threshold value.

In one embodiment, the first resistor and the equivalent resistance are connected in parallel to form a parallel-connected resistance, and the parallel-connected resistance and the second resistor are connected in series. The first voltage is a voltage acquired by dividing the work voltage on the parallel-connection resistance.

In one embodiment, when a liquid having an equivalent resistance is attached on the channel configuration pin, the second voltage acquired by dividing the work voltage according to the equivalent resistance and the second resistor is less than the second lower threshold value.

In one embodiment, the second resistor and the equivalent resistance are connected in series. The second voltage is a voltage acquired by dividing the work voltage on the equivalent resistance.

In one embodiment, the controller provides a detection control signal with a turned-on period and a turned-off period within a time interval to control the detection switch; during the turned-on period, the controller detects the first voltage and the second voltage once each; during the turned-off period, the controller does not detect the first voltage and the second voltage.

In one embodiment, when a liquid is attached on the sideband use pin or the channel configuration pin, the controller provides a detection control signal with a plurality of alternating turned-on periods and turned-off periods within a time interval to control the detection switch; during each turned-on period, the controller detects the first voltage and the second voltage once each; during each turned-off period, the controller does not detect the first voltage and the second voltage.

Another objective of the present disclosure is to provide a power supply device, and the power supply device includes a Type-C connection port, a controller, a first resistor, a second resistor, a detection switch, and a power-supply switch. The Type-C connection port includes a channel configuration pin, a sideband use pin, and a power-output pin. The controller is coupled to the channel configuration pin through a first path, and coupled to the sideband use pin through a second path. The first resistor is coupled to the sideband use pin through the second path. The second resistor is coupled to the channel configuration pin and the sideband use pin through the first path and the second path respectively. The detection switch is coupled between the controller and the channel configuration pin and the sideband use pin through the second resistor, and the detection switch receives a work voltage. The power-supply switch is coupled to the power-output pin, and the power-supply switch receives a power-supply voltage. Based on the power supply device being in a first operating state, the controller controls the detection switch to be turned on so that the work voltage is provided to the second resistor and the first resistor to detect a first voltage and a second voltage. The controller turns on or turns off the power-supply switch according to the first voltage and the second voltage to control whether the power-supply voltage is transmitted to the power-output pin. Based on the power supply device being in a second operating state, the controller outputs a detection current through the channel configuration pin, and acquires a detection voltage on the channel configuration pin. When the controller detects that the detection voltage exists, the controller controls the power-supply switch to be turned on to detect the first voltage and the second voltage. The controller turns on or turns off the power-supply switch according to the first voltage or the second voltage to control whether the power-supply voltage is transmitted to the power-output pin. The first voltage is a voltage between the sideband use pin and a ground terminal, and the second voltage is a voltage between the channel configuration pin and the ground terminal.

In one embodiment, based on the power supply device being in the first operating state, when a liquid having an equivalent resistance is attached on the sideband use pin, the first voltage acquired by dividing the work voltage according to the equivalent resistance, the first resistor, and the second resistor is less than a first lower threshold value. The first resistor and the equivalent resistance are connected in parallel to form a parallel-connected resistance, and the parallel-connected resistance and the second resistor are connected in series. The first voltage is a voltage acquired by dividing the work voltage on the parallel-connection resistance.

In one embodiment, based on the power supply device being in the first operating state, when a liquid having an equivalent resistance is attached on the channel configuration pin, the second voltage acquired by dividing the work voltage according to the equivalent resistance and the second resistor is less than a second lower threshold value. The second resistor and the equivalent resistance are connected in series. The second voltage is a voltage acquired by dividing the work voltage on the equivalent resistance.

In one embodiment, based on the power supply device being in the second operating state, when a liquid having an equivalent resistance is attached on the sideband use pin, the first voltage acquired by dividing the power-supply voltage according to an equivalent resistance and the first resistor is greater than a first upper threshold value. The equivalent resistance and the first resistor are connected in series. The first voltage is a voltage acquired by dividing the power-supply voltage on the first resistor.

In one embodiment, based on the power supply device being in the second operating state, when a liquid having an equivalent resistance is attached on the channel configuration pin, the second voltage acquired by dividing the power-supply voltage is greater than a second upper threshold value.

In one embodiment, based on the power supply device being in the second operating state and the liquid attached on the sideband use pin or the channel configuration pin is removed, the power supply device is changed from the original second operating state to the first operating state, and then the power supply device is returned to the second operating state again.

Accordingly, the power supply device disclosed in the present disclosure has the following features and advantages: abnormal conditions of liquid attached on the sideband use pins and/or channel configuration pins are detected so that the power-supply voltage cannot be transmitted to the power-output pin to ensure the safety of the power supply device.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
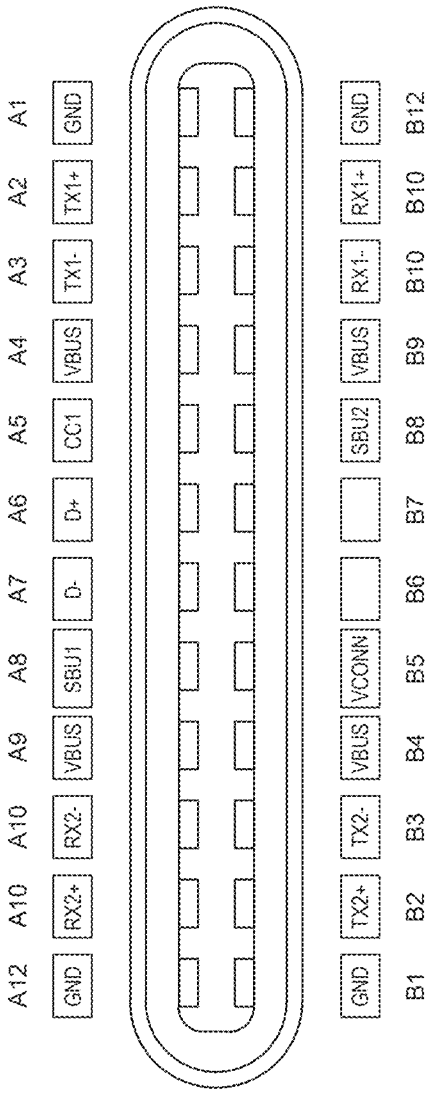
FIG. 1 is a schematic diagram of pin definitions of the Type-C connection port of the power supply device according to the present disclosure.

Reference will now be made to the drawing figures to describe the present disclosure in detail. It will be understood that the drawing figures and exemplified embodiments of present disclosure are not limited to the details thereof.

The structures, proportions, sizes, and number of components shown in the drawings attached to the present disclosure are only used to match the content in the present disclosure, for those who are familiar with this technology to understand and read, and are not used to limit the implementation of the present disclosure. Any modification of structure, change of proportional relationship or adjustment of size shall fall within the scope covered by the technical content disclosed in the present disclosure, provided that it does not affect the effect and purpose of the present disclosure.

Please refer to FIG. 1, which shows a schematic diagram of pin definitions of the Type-C connection port of the power supply device according to the present disclosure. The technology of the present disclosure mainly uses the impedance changes between the internal pins of the USB Type-C connection port to determine whether there are physical foreign objects (such as dust) or liquid foreign objects (such as water) with impedance lower than the air impedance attached between pins. Therefore, two pins closest to the power output pins VBUS (A9, B9), i.e., the channel configuration pins CC1 (A5), VCONN (B5) and the sideband use pins SBU1 (A8), SBU2 (B8) are used. Moreover, based on the principle that the impedance of foreign objects or liquid foreign objects is smaller than the air impedance, the voltage range of impedance detection is formulated to determine whether there are foreign objects or liquid foreign objects attached between the pins.

Figure 2:
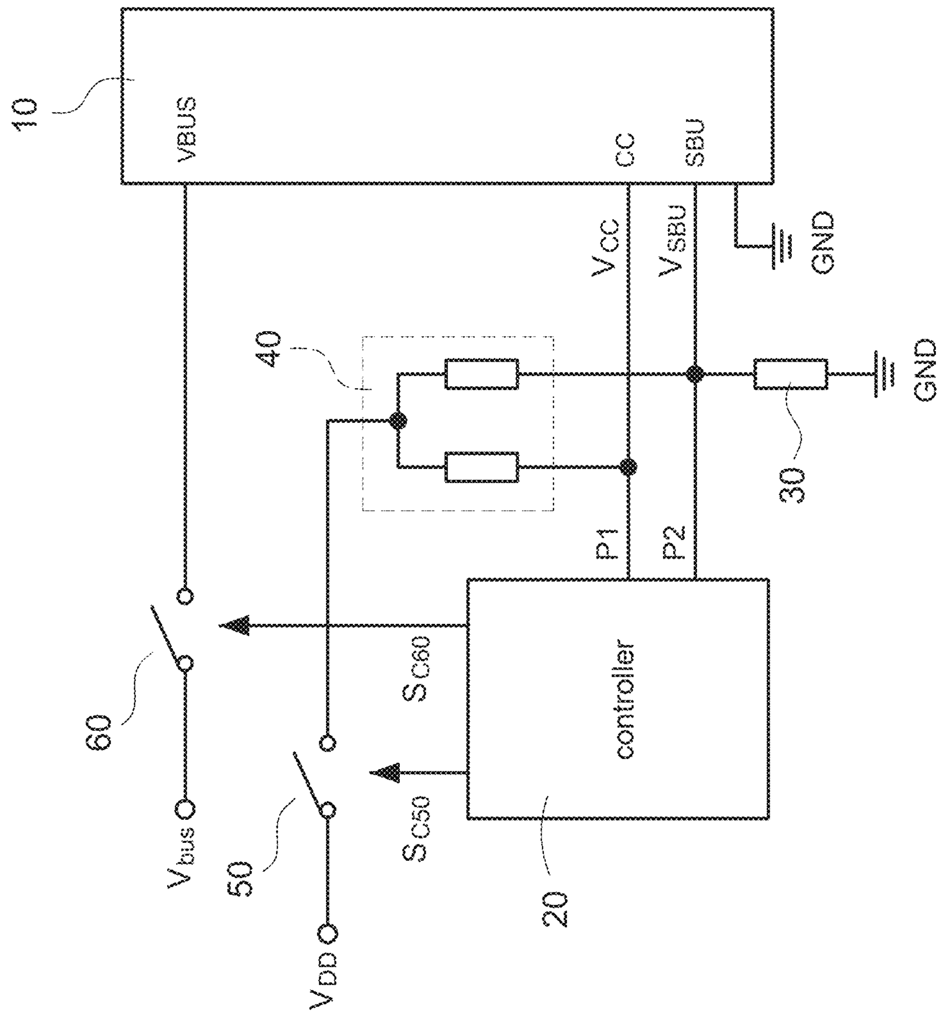
FIG. 2 is a block diagram of a power supply device according to a first embodiment of the present disclosure.

Please refer to FIG. 2, which shows a block diagram of a power supply device according to a first embodiment of the present disclosure. The power supply device includes a Type-C connection port 10, a controller 20, a first resistor 30, a second resistor 40, a detection switch 50, and a power-supply switch 60. The Type-C connection port 10 includes a channel configuration pin CC, a sideband use pin SBU, and a power-output pin VBUS. The controller 20 is coupled to the channel configuration pin CC through a first path P1 and coupled to the sideband use pin SBU through a second path P2.

The first resistor 30 is coupled to the sideband use pin SBU through the second path P2. The second resistor 40 is coupled to the channel configuration pin CC and the sideband use pin SBU through the first path P1 and the second path P2 respectively. The detection switch 50 is coupled between the controller 20 and the channel configuration pin CC and the sideband use pin SBU through the second resistor 40, and the detection switch 50 is used to receive a work voltage $V_{DD}$. In particular, the work voltage $V_{DD}$ may be a voltage externally provided or a voltage internally provided by the controller 20, and a value of the work voltage $V_{DD}$ may be 4.85V±5%, but this is not a limitation of the present disclosure. The power-supply switch 60 is coupled to the power-output pin VBUS, and the power-supply switch 60 is used to receive a power-supply voltage Vbus.

The controller 20 is used to control the detection switch 50 to be turned on by a detection control signal $S_{C50}$ provided by the controller 20 so that the work voltage $V_{DD}$ is provided to the second resistor 40 and the first resistor 30 to detect a first voltage $V_{SBU}$ between the sideband use pin SBU and a ground terminal GND and detect a second voltage $V_{CC}$ between the channel configuration pin CC and the ground terminal GND. For example, based on the work voltage $V_{DD}$ being applied to the second resistor 40, a detection current of, for example, but not limited to 2.5 microamps (μA) will be generated, thereby generating the second voltage $V_{CC}$ on the channel configuration pin CC. The controller 20 provides a power-supply control signal $S_{C60}$ to turn on or turn off the power-supply switch 60 according to the first voltage $V_{SBU}$ or the second voltage $V_{CC}$ so as to control whether the power-supply voltage Vbus is transmitted to the power-output pin VBUS.

Figure 3:
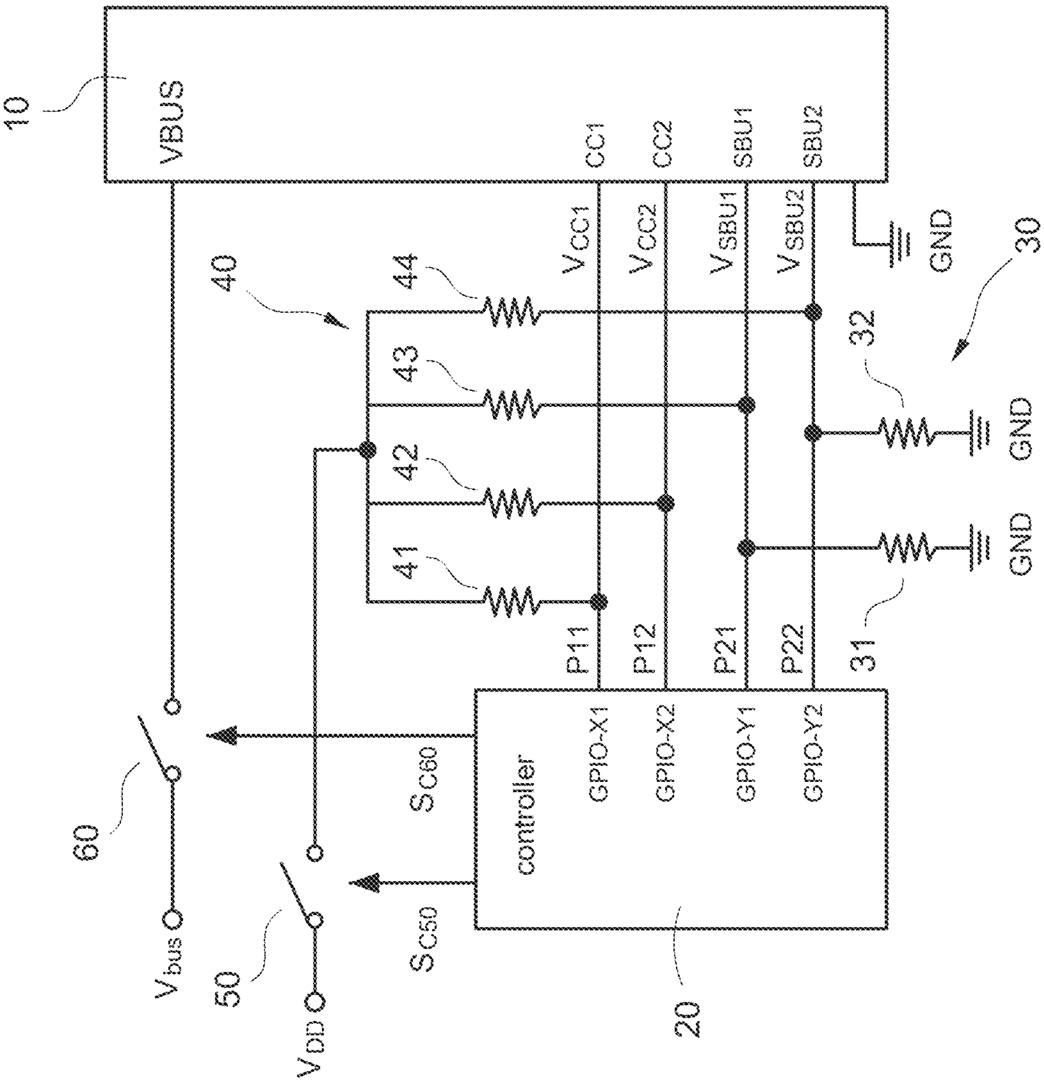
FIG. 3 is a detailed block circuit diagram of the power supply device according to the first embodiment of the present disclosure.

Please refer to FIG. 3, which shows a detailed block circuit diagram of the power supply device according to the first embodiment of the present disclosure. As mentioned above, the present disclosure uses the four pins closest to the power-output pin, that is, two channel configuration pins and two sideband use pins, to determine whether there is any object or liquid foreign matter attached between the pins. Therefore, a pin GPIO-X1 of the controller 20 is connected to a channel configuration pin CC1 of the Type-C connection port 10 through a path P11, a pin GPIO-X2 of the controller 20 is connected to a channel configuration pin CC2 of the Type-C connection port 10 through a path P12, a pin GPIO-Y1 of the controller 20 is connected to a sideband use pin SBU1 of the Type-C connection port 10 through a path P21, and a pin GPIO-Y2 of the controller 20 is connected to a sideband use pin SBU2 of the Type-C connection port 10 through a path P22.

The first resistor 30 includes two resistors 31, 32. A first terminal of the resistor 31 is connected to the path P21, and a second terminal of the resistor 31 is connected to the ground terminal GND. A first terminal of the resistor 32 is connected to the path P22, and a second terminal of the resistor 32 is connected to the ground terminal GND. The second resistor 40 includes four resistors 41, 42, 43, 44. A first terminal of the resistor 41 is connected to the detection switch 50, and a second terminal of the resistor 41 is connected to the path P11. A first terminal of the resistor 42 is connected to the detection switch 50, and a second terminal of the resistor 42 is connected to the path P12. A first terminal of the resistor 43 is connected to the detection switch 50, and a second terminal of the resistor 43 is connected to the path P21. A first terminal of the resistor 44 is connected to the detection switch 50, and a second terminal of the resistor 44 is connected to the path P22.

For convenience of explanation, the power supply device shown in FIG. 2 is taken as an example. Incidentally, the power supply device shown in FIG. 2 is a part of the USB Type-C charger, which includes the Type-C connection port 10, and the power supply device is not connected to a charging device. When the first voltage $V_{SBU}$ is less than the first lower threshold value, the controller 20 turns off the power-supply switch 60 so that the power-supply voltage Vbus cannot be transmitted to the power-output pin VBUS. When the first voltage $V_{SBU}$ is greater than the first lower threshold value, the controller 20 turns on the power-supply switch 60 so that the power-supply voltage Vbus is transmitted to the power-output pin VBUS. For example, the first lower threshold value may be 0.73 volts, but this does not limit the present disclosure.

When the second voltage $V_{CC}$ is less than a second lower threshold value, the controller 20 is used to turn off the power-supply switch 60 so that the power-supply voltage Vbus cannot be transmitted to the power-output pin VBUS. When the second voltage $V_{CC}$ is greater than the second lower threshold value, the controller 20 is used to turn on the power-supply switch 60 so that the power-supply voltage Vbus is transmitted to the power-output pin VBUS. For example, the second lower threshold value may be 1.8 volts, but this does not limit the present disclosure.

Therefore, due to the above-mentioned characteristics, if there is foreign matter attached between the pins of the Type-C connection port 10 of the power supply device, for example, object foreign matter (such as dust) or liquid foreign matter (such as water) with an impedance lower than the air impedance is attached between the pins of the Type-C connection port 10, especially the sideband use pins SBU and channel configuration pins CC. Therefore, this abnormal situation will be detected and the power-supply voltage Vbus will not be transmitted to the power-output pin VBUS to ensure the safety of the power supply device.

Figure 6:
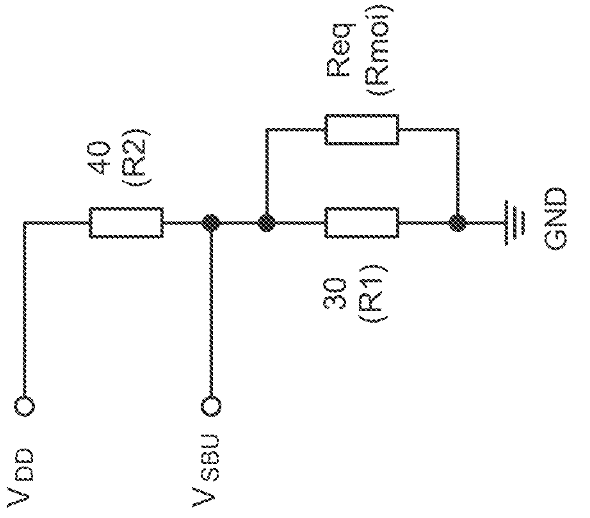
FIG. 6 is a schematic circuit diagram of a divided voltage of a sideband use pin of the power supply device in a first operating state according to the present disclosure.

Taking the sideband use pin SBU as an example to illustrate. Please refer to FIG. 6, which shows a schematic circuit diagram of a divided voltage of a sideband use pin of the power supply device in a first operating state according to the present disclosure. When the liquid having an equivalent resistance Req is attached on the sideband use pin SBU, a first voltage $V_{SBU}$ acquired by dividing the work voltage $V_{DD}$ according to the equivalent resistance Req, the first resistor 30, and the second resistor 40 is less than the first lower threshold value. In particular, the first resistor 30 and the equivalent resistance Req are connected in parallel to form a parallel-connected resistance, and the parallel-connected resistance and the second resistor 40 are connected in series. In particular, the first voltage $V_{SBU}$ is a voltage acquired by dividing the work voltage $V_{DD}$ on the parallel-connection resistance, that the first voltage $V_{SBU}$ is:

$$V_{SBU} = V_{DD} \times \frac{(R1//Rmoi)}{(R1//Rmoi) + R2},$$

where $V_{SBU}$ is the first voltage, $V_{DD}$ is the work voltage, R1 is the resistance value of the first resistor 30, R2 is the resistance value of the second resistor 40, Rmoi is the equivalent resistance value of the liquid attached on the sideband use pin SBU.

Figure 7:
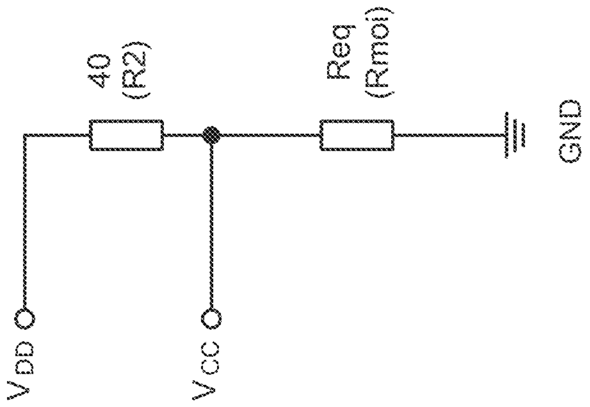
FIG. 7 is a schematic circuit diagram of a divided voltage of a channel configuration pin of the power supply device in the first operating state according to the present disclosure.

Taking the channel configuration pin CC as an example to illustrate. Please refer to FIG. 7, which shows a schematic circuit diagram of a divided voltage of a channel configuration pin of the power supply device in the first operating state according to the present disclosure. When the liquid having an equivalent resistance Req is attached on the channel configuration pin CC, a second voltage $V_{CC}$ acquired by dividing the work voltage $V_{DD}$ according to the equivalent resistance Req and the second resistor 40 is less than the second lower threshold value. In particular, the second resistor 40 and the equivalent resistance Req are connected in series. In particular, the second voltage $V_{CC}$ is a voltage acquired by dividing the work voltage $V_{DD}$ on the equivalent resistance Req, that the second voltage $V_{CC}$ is:

$$V_{CC} = V_{DD} \times \frac{Rmoi}{Rmoi + R2},$$

where $V_{CC}$ is the second voltage, $V_{DD}$ is the work voltage, R2 is the resistance value of the second resistor 40, Rmoi is the equivalent resistance value of the liquid attached on the channel configuration pin CC.

Figure 10:
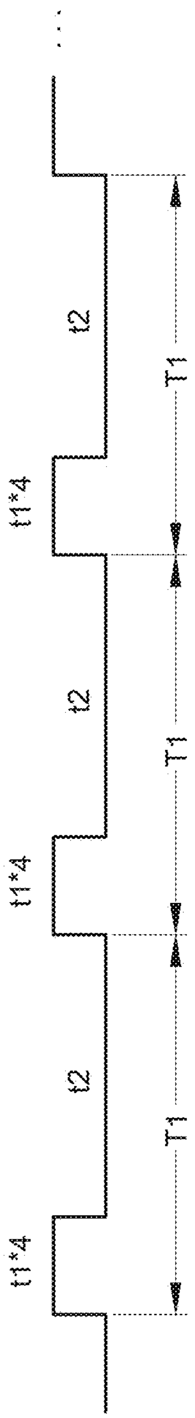
FIG. 10 is a schematic diagram of detecting a voltage when there is no liquid is attached according to the power supply device of the present disclosure.

Please refer to FIG. 10, which shows a schematic diagram of detecting a voltage when no liquid is attached according to the power supply device of the present disclosure, and taking FIG. 3 as an example to illustrate. When it is determined that there is no liquid is attached based on the impedance, voltages of two channel configuration pins CC1, CC2 and voltages of two sideband use pins SBU1, SBU2 are detected in four detection times (t1*4) during a time period T1 (for example, 1 second, but not limited to this) to determine whether there is still no liquid attached or there is liquid attached. In particular, each time is 128 microseconds (μs), but this is not a limitation of the present disclosure, and no voltage detection is performed during the remaining times (i.e., non-detection time t2). Specifically, the controller 20 provides a detection control signal $S_{C50}$ with a turned-on period (i.e., the four detection times t1*4) and a turned-off period (i.e., the non-detection time t2) within a time interval (i.e., the time period T1) to control the detection switch 50. During the turned-on period, the controller 20 detects the first voltage $V_{SBU}$ (including the voltage $V_{SBU1}$ and the voltage $V_{SBU1}$ shown in FIG. 3) and the second voltage $V_{CC}$ (including the voltage $V_{CC1}$ and the voltage $V_{CC2}$ shown in FIG. 3) once each. During the turned-off period, the controller 20 does not detect the first voltage $V_{SBU}$ and the second voltage $V_{CC}$.

Figure 11:
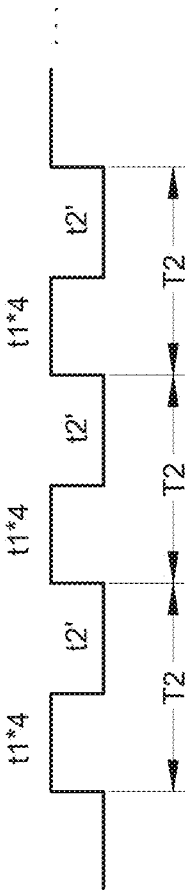
FIG. 11 is a schematic diagram of detecting a voltage when there is liquid is attached according to the power supply device of the present disclosure.

Please refer to FIG. 11, which shows a schematic diagram of detecting a voltage when there is liquid is attached according to the power supply device of the present disclosure. When it is determined that there is liquid is attached based on the impedance, voltages of two channel configuration pins CC1, CC2 and voltages of two sideband use pins SBU1, SBU2 are detected in four detection times (t1*4) during a time period T2 (for example, 1.5 milliseconds, but not limited to this) to determine whether there is still a liquid attached or there is no liquid attached. In particular, each time is 128 microseconds (μs), but this is not a limitation of the present disclosure, and no voltage detection is performed during the remaining times (i.e., non-detection time t2'). Compared with FIG. 10, when there is liquid attached, the detection period is shortened (for example, from 1 second to 1.5 milliseconds, but this does not limit the invention). Therefore, by increasing the frequency of voltage detection, it can be more quickly determined whether the liquid attached on the two channel configuration pins CC1, CC2 or the two sideband use pins SBU1, SBU2 has been removed or is still attached. Specifically, the controller 20 provides a detection control signal $S_{C50}$ with a turned-on period (i.e., the four detection times t1*4) and a turned-off period (i.e., the non-detection time t2') within a time interval (i.e., the time period T2) to control the detection switch 50. During the turned-on period, the controller 20 detects the first voltage $V_{SBU}$ (including the voltage $V_{SBU1}$ and the voltage $V_{SBU1}$ shown in FIG. 3) and the second voltage $V_{CC}$ (including the voltage $V_{CC1}$ and the voltage $V_{CC2}$ shown in FIG. 3) once each. During the turned-off period, the controller 20 does not detect the first voltage $V_{SBU}$ and the second voltage $V_{CC}$.

Figure 4:
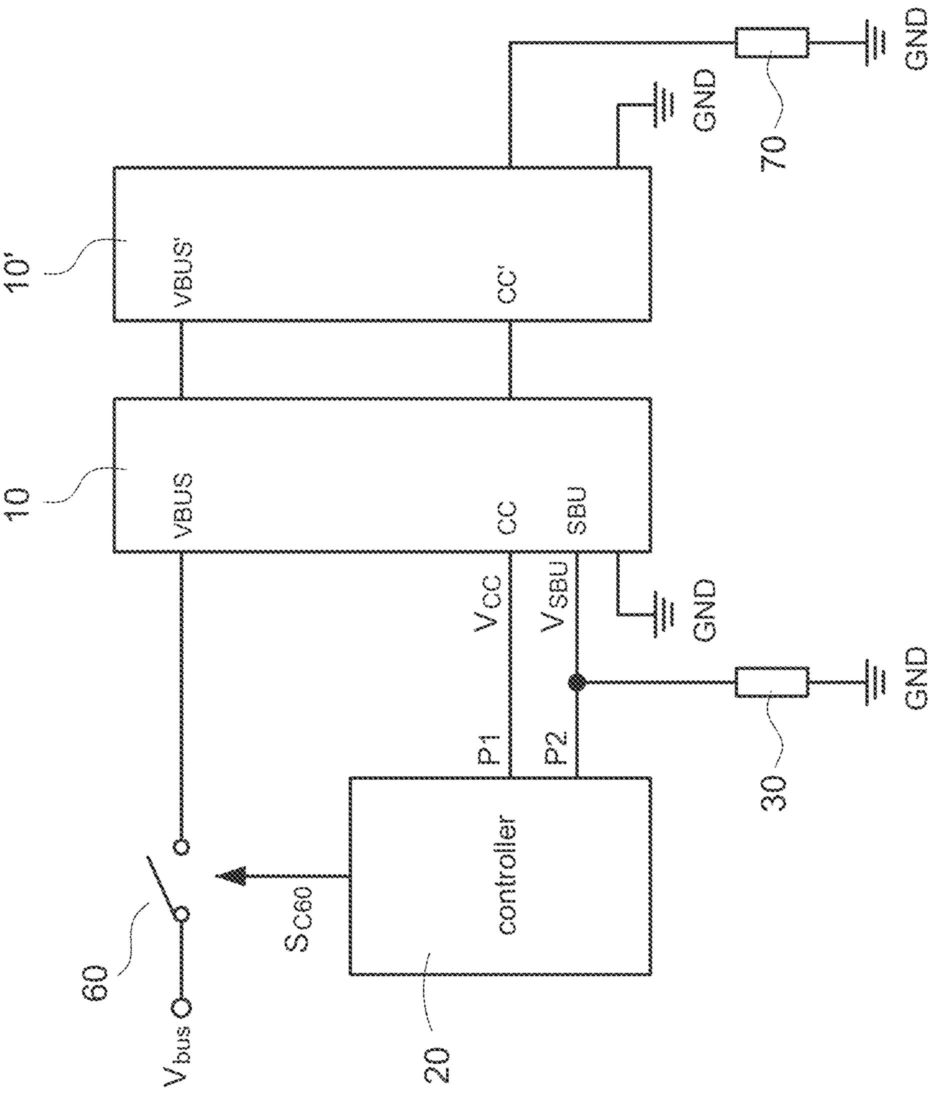
FIG. 4 is a block diagram of the power supply device according to a second embodiment of the present disclosure.

Please refer to FIG. 4, which shows a block diagram of the power supply device according to a second embodiment of the present disclosure. The power supply device includes a Type-C connection port 10, a controller 20, a first resistor 30, and a power-supply switch 60. The Type-C connection port 10 includes a channel configuration pin CC, a sideband use pin SBU, and a power-output pin VBUS. The controller 20 is coupled to the channel configuration pin CC through a first path P1 and coupled to the sideband use pin SBU through a second path P2. The first resistor 30 is coupled to the sideband use pin SBU through the second path P2. The power-supply switch 60 is coupled to the power-output pin VBUS, and the power-supply switch 60 is used to receive a power-supply voltage Vbus.

Incidentally, the power supply device shown in FIG. 4 is a part of the USB Type-C charger, which includes the Type-C connection port 10, and the power supply device is connected to a charging device including a Type-C connection port 10'. When the controller 20 outputs a detection current through the channel configuration pin CC, for example, but not limited to, 330 microamps (μA), and the detection current interacts with an external resistor 70 (detailed later), a detection voltage is acquired on the channel configuration pin CC, that is, the detection voltage is equal to the product of the detection current and the resistance value of the external resistor 70. For example, if the resistance value of the external resistor 70 is 5.1 kΩ, the detection voltage is about 1.68 volts. Therefore, when the controller 20 detects that the detection voltage exists, or detects that the detection voltage is a reasonable voltage value (for example, the detection voltage falls between 1.5 and 1.9 volts), the controller 20 controls the power-supply switch 60 to be turned on to detect the first voltage $V_{SBU}$ between the sideband use pin SBU and the ground terminal GND, and the second voltage $V_{CC}$ between the channel configuration pin CC and the ground terminal GND. In particular, the controller 20 turns on or turns off the power-supply switch 60 according to the first voltage $V_{SBU}$ or the second voltage $V_{CC}$ to turn on or turn off the power-supply switch 60 so as to control whether the power-supply voltage Vbus is transmitted to the power-output pin VBUS.

For convenience of explanation, the power supply device shown in FIG. 4 is taken as an example. When the first voltage $V_{SBU}$ is less than a first upper threshold value, the controller 20 turns off the power-supply switch 60 so that the power-supply voltage Vbus cannot be transmitted to the power-output pin VBUS. When the first voltage $V_{SBU}$ is less than the first upper threshold value, the controller 20 continuously turns on the power-supply switch 60 so that the power-supply voltage Vbus is transmitted to the power-output pin VBUS. For example, the first upper threshold value may be 2.2 volts, but this does not limit the present disclosure.

When the second voltage $V_{CC}$ is greater than a second upper threshold value, the controller 20 is used to turn off the power-supply switch 60 so that the power-supply voltage Vbus cannot be transmitted to the power-output pin VBUS. When the second voltage $V_{CC}$ is less than the second upper threshold value, the controller 20 continuously turns on the power-supply switch 60 so that the power-supply voltage Vbus is transmitted to the power-output pin VBUS. For example, the second upper threshold value may be 2.6 volts, but this does not limit the present disclosure.

Therefore, due to the above-mentioned characteristics, if there is foreign matter attached between the pins of the Type-C connection port 10 of the power supply device, for example, object foreign matter (such as dust) or liquid foreign matter (such as water) with an impedance lower than the air impedance is attached between the pins of the Type-C connection port 10, especially the sideband use pins SBU and channel configuration pins CC. Therefore, this abnormal situation will be detected and the power-supply voltage Vbus will not be transmitted to the power-output pin VBUS to ensure the safety of the power supply device.

Figure 8:
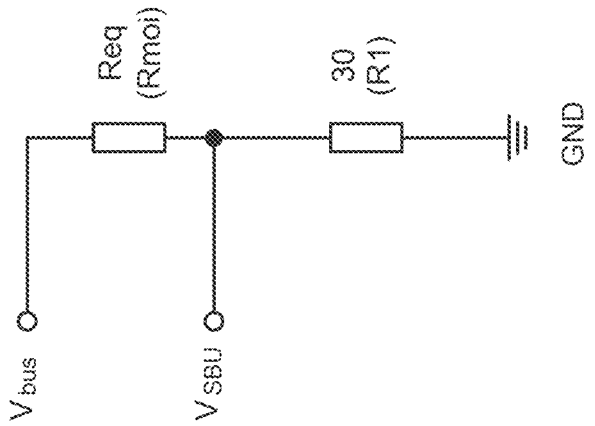
FIG. 8 is a schematic circuit diagram of a divided voltage of the sideband use pin of the power supply device in a second operating state according to the present disclosure.

Taking the sideband use pin SBU as an example to illustrate. Please refer to FIG. 8, which shows a schematic circuit diagram of a divided voltage of the sideband use pin of the power supply device in a second operating state according to the present disclosure. When the liquid having an equivalent resistance Req is attached on the sideband use pin SBU, a first voltage $V_{SBU}$ acquired by dividing the power-supply voltage Vbus according to the equivalent resistance Req and the first resistor 30 is greater than the first upper threshold value. In particular, the equivalent resistance Req and the first resistor 30 are connected in series. In particular, the first voltage $V_{SBU}$ is a voltage acquired by dividing the power-supply voltage Vbus on the first resistor 30, that the first voltage $V_{SBU}$ is:

$$V_{SBU} = Vbus \times \frac{R1}{R1 + Rmoi},$$

where $V_{SBU}$ is the first voltage, $V_{bus}$ is the power-supply voltage, R1 is the resistance value of the first resistor 30, Rmoi is the equivalent resistance value of the liquid attached on the sideband use pin SBU.

Figure 9:
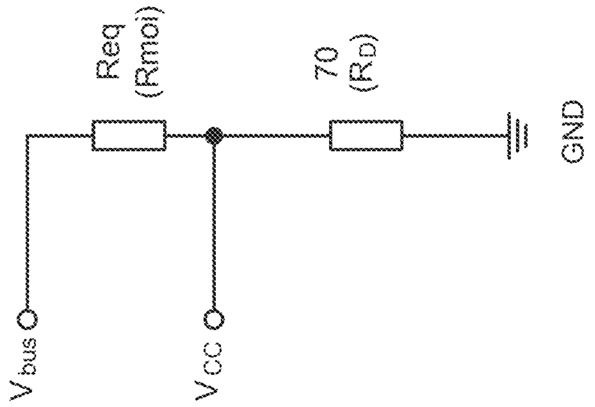
FIG. 9 is a schematic circuit diagram of a divided voltage of the channel configuration pin of the power supply device in the second operating state according to the present disclosure.

Taking the channel configuration pin CC as an example to illustrate. Please refer to FIG. 9, which shows a schematic circuit diagram of a divided voltage of the channel configuration pin of the power supply device in the second operating state according to the present disclosure. When the liquid having an equivalent resistance Req is attached on the channel configuration pin CC, a second voltage $V_{CC}$ acquired by dividing the power-supply voltage Vbus is greater than the second upper threshold value. As shown in FIG. 4, the Type-C connection port 10 of the power supply device is further coupled to the external resistor 70 through the channel configuration pin CC. When the liquid having an equivalent resistance Req is attached on the channel configuration pin CC, the second voltage $V_{CC}$ acquired by dividing the power-supply voltage Vbus according to the equivalent resistance Req and the external resistor 70 is greater than the second upper threshold value. In particular, the equivalent resistance Req and the external resistor 70 are connected in series. In particular, the second voltage $V_{CC}$ is a voltage acquired by dividing the power-supply voltage Vbus on the external resistor 70, that the second voltage $V_{CC}$ is:

$$V_{CC} = V_{bus} \times \frac{R_D}{R_D + Rmoi},$$

where $V_{CC}$ is the second voltage, Vbus is the power-supply voltage, $R_D$ is the resistance value of the external resistor 70, Rmoi is the equivalent resistance value of the liquid attached on the channel configuration pin CC.

Figure 5:
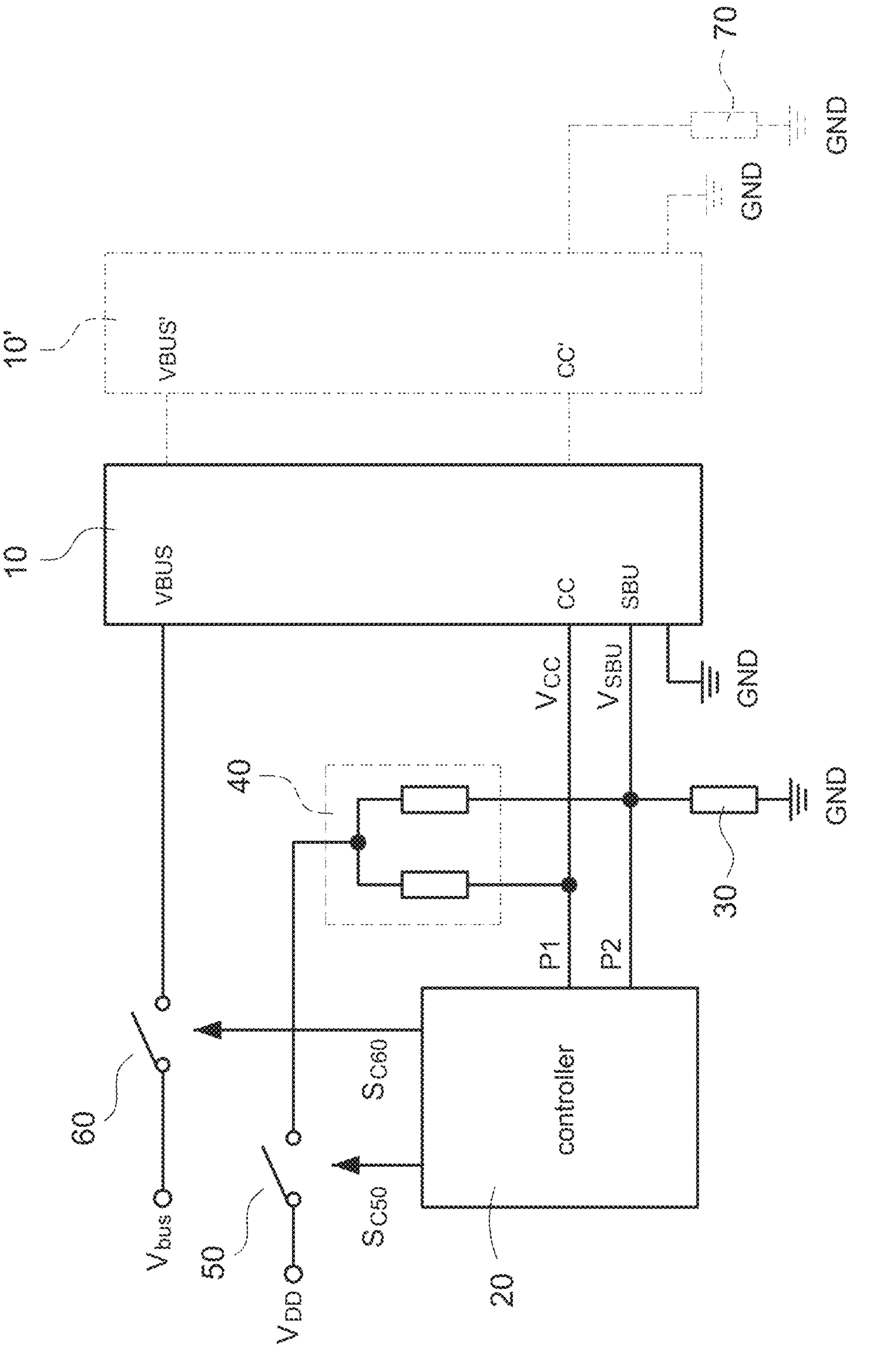
FIG. 5 is a block diagram of operating the power supply device according to the first embodiment and the second embodiment of the present disclosure.

Please refer to FIG. 5, which shows a block diagram of operating the power supply device according to the first embodiment (corresponding to FIG. 2) and the second embodiment (corresponding to FIG. 4) of the present disclosure. Incidentally, the power supply device shown in FIG. 5 is a part of the USB Type-C charger, which includes the Type-C connection port 10. Therefore, the power supply device of the present invention is used to connect a charging device with a Type-C connection port 10', such as but not limited to a mobile phone, a tablet, a laptop, and a wearable device. As shown in FIG. 5, the charging device with the Type-C connection port 10' is shown as a dotted line, which means that the power supply device is not connected to the charging device, that is, it is in the first operating state, which corresponds to FIG. 2. If the power supply device is connected to the charging device, it is in the second operating state, which corresponds to FIG. 4.

Regarding the circuit composition and connection relationship of the power supply device of the present disclosure, please refer to the above contents, and will not be described in detail here. Based on the first operating state of the power supply device, for example, the power supply device is not connected to the charging device. For example, when the USB Type-C charger (i.e., the power supply device) is not connected to the mobile phone (i.e., the charging device) and does not charge the mobile phone, the controller 20 controls the detection switch 50 to be turned on so that the work voltage $V_{DD}$ is provided to the second resistor 40 and the first resistor 30 to detect the first voltage $V_{SBU}$ and the second voltage $V_{CC}$. The controller 20 turns on or turns off the power-supply switch 60 according to the first voltage $V_{SBU}$ or the second voltage $V_{CC}$ to control whether the power-supply voltage Vbus is transmitted to the power-output pin VBUS.

Based on the first operating state of the power supply device, when the liquid having an equivalent resistance Req is attached on the sideband use pin SBU, the first voltage $V_{SBU}$ acquired by dividing the work voltage $V_{DD}$ according to the equivalent resistance Req, the first resistor 30, and the second resistor 40 is less than the first lower threshold value. In particular, the first resistor 30 and the equivalent resistance Req are connected in parallel to form the parallel-connected resistance, and the parallel-connected resistance and the second resistor 40 are connected in series. In particular, the first voltage $V_{SBU}$ is a voltage acquired by dividing the work voltage $V_{DD}$ on the parallel-connection resistance.

Based on the first operating state of the power supply device, when the liquid having an equivalent resistance Req is attached on the channel configuration pin CC, a second voltage $V_{CC}$ acquired by dividing the work voltage $V_{DD}$ according to the equivalent resistance Req and the second resistor 40 is less than the second lower threshold value. In particular, the second resistor 40 and the equivalent resistance Req are connected in series. In particular, the second voltage $V_{CC}$ is a voltage acquired by dividing the work voltage $V_{DD}$ on the equivalent resistance Req.

Based on the second operating state of the power supply device, for example, the power supply device is connected to the charging device. For example, the USB Type-C charger (i.e., the power supply device) charges the mobile phone (i.e., the charging device), the controller 20 outputs the detection current through the channel configuration pin CC, and acquires the detection voltage on the channel configuration pin CC. When the controller 20 detects that the detection voltage exists, the controller 20 controls the power-supply switch 60 to be turned on to detect the first voltage $V_{SBU}$ and the second voltage $V_{CC}$. The controller 20 turns on or turns off the power-supply switch 60 according to the first voltage $V_{SBU}$ or the second voltage $V_{CC}$ to control whether the power-supply voltage Vbus is transmitted to the power-output pin VBUS. In particular, the first voltage $V_{SBU}$ is a voltage between the sideband use pin SBU and the ground terminal GND, and the second voltage $V_{CC}$ is a voltage between the channel configuration pin CC and the ground terminal GND.

Based on the second operating state of the power supply device, when the liquid having an equivalent resistance Req is attached on the sideband use pin SBU, a first voltage $V_{SBU}$ acquired by dividing the power-supply voltage Vbus according to the equivalent resistance Req and the first resistor 30 is greater than the first upper threshold value. In particular, the equivalent resistance Req and the first resistor 30 are connected in series. In particular, the first voltage $V_{SBU}$ is a voltage acquired by dividing the power-supply voltage Vbus on the first resistor 30.

Based on the second operating state of the power supply device, when the liquid having an equivalent resistance Req is attached on the channel configuration pin CC, a second voltage $V_{CC}$ acquired by dividing the power-supply voltage Vbus is greater than the second upper threshold value. The Type-C connection port 10 of the power supply device is further coupled to the external resistor 70 through the channel configuration pin CC. When the liquid having an equivalent resistance Req is attached on the channel configuration pin CC, the second voltage $V_{CC}$ acquired by dividing the power-supply voltage Vbus according to the equivalent resistance Req and the external resistor 70 is greater than the second upper threshold value. In particular, the equivalent resistance Req and the external resistor 70 are connected in series. In particular, the second voltage $V_{CC}$ is a voltage acquired by dividing the power-supply voltage Vbus on the external resistor 70.

Figure 12:
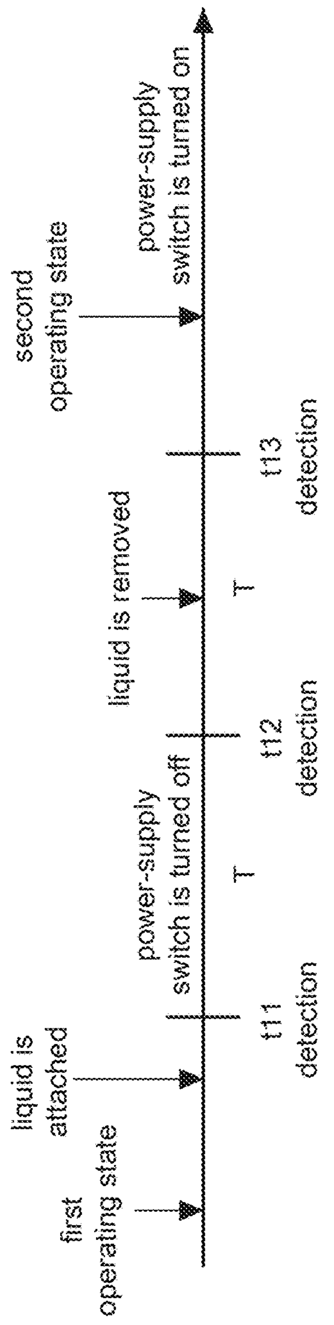
FIG. 12 is a schematic diagram of a first operating situation according to the power supply device of the present disclosure.

Please refer to FIG. 12, which shows a schematic diagram of a first operating situation according to the power supply device of the present disclosure. Before time t11, it is assumed that the power supply device is in the first operating state, that is, the power supply device is not connected to the charging device. Also, there is liquid attached on the Type-C connection port 10 of the power supply device, and therefore the liquid attached on the Type-C connection port 10 is detected at time t11 according to the detected first voltage $V_{SBU}$ and/or the second voltage $V_{CC}$. Afterward, the power-supply control signal $S_{C60}$ provided by the controller 20 turns off the power-supply switch 60 to prevent the power supply voltage Vbus from being transmitted to the power-output pin VBUS. Afterward, the same situation is detected at time t12, and therefore the power-supply switch 60 is still controlled to be turned off.

It is assumed that the liquid attached on the Type-C connection port 10 is removed after time t12 and before the next detection time t13, and therefore the liquid removed from the Type-C connection port 10 is detected at time t13 according to the detected first voltage $V_{SBU}$ and/or the second voltage $V_{CC}$. After time t13, it is assumed that the power supply device is in the second operating state, that is, the power supply device is connected to the charging device. Therefore, the power-supply control signal $S_{C60}$ provided by the controller 20 turns on the power-supply switch 60 so that the power-supply voltage Vbus is transmitted to the power-output pin VBUS to supply the charging power required by the charging device.

Figure 13:
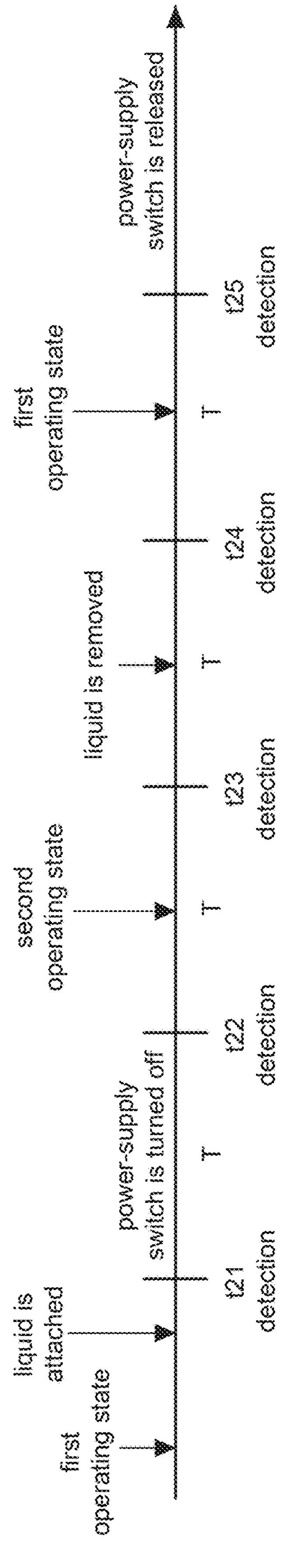
FIG. 13 is a schematic diagram of a second operating situation according to the power supply device of the present disclosure.

Please refer to FIG. 13, which shows a schematic diagram of a second operating situation according to the power supply device of the present disclosure. Before time t21, it is assumed that the power supply device is in the first operating state, that is, the power supply device is not connected to the charging device. Also, there is liquid attached on the Type-C connection port 10 of the power supply device, and therefore the liquid attached on the Type-C connection port 10 is detected at time t21. Afterward, the power-supply control signal $S_{C60}$ provided by the controller 20 turns off the power-supply switch 60 to prevent the power supply voltage Vbus from being transmitted to the power-output pin VBUS. Afterward, the same situation is detected at time t22, and therefore the power-supply switch 60 is still controlled to be turned off.

After time t22, it is assumed that the power supply device is in the second operating state, that is, the power supply device is connected to the charging device, and therefore the liquid attached on the Type-C connection port 10 is detected at time t23. It is assumed that no liquid is attached on the Type-C connection port 10 of the power supply device after time t23 (that is, the liquid is removed), and therefore no liquid attached on the Type-C connection port 10 is detected at time t24. In the present disclosure, under this situation, the power supply device must be changed from the original second operating state to the first operating state, and then the power supply device is returned to the second operating state again. In other words, when the power supply device is connected to the charging device, and the Type-C connection port 10 changes from the liquid-attached situation to the liquid-removed situation, the controller 20 cannot directly control the power-supply switch 60 to provide the power-supply voltage Vbus to charge the charging device, instead, the power supply device and the charging device must first be disconnected (that is, return to the first operating state, for example, by unplugging the connection between the charging device and the power supply device), and therefore unplugging the connection between the charging device and the power supply device is detected at time t25. Therefore, the power-supply switch 60 is unlocked and enters a state that can be controlled to conduct by the controller 20.

Accordingly, the power supply device disclosed in the present disclosure has the following features and advantages: abnormal conditions of liquid attached on the sideband use pins and/or channel configuration pins are detected so that the power-supply voltage cannot be transmitted to the power-output pin to ensure the safety of the power supply device.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply device, comprising:

a Type-C connection port, comprising a channel configuration pin, a sideband use pin, and a power-output pin, a controller, coupled to the channel configuration pin through a first path, and coupled to the sideband use pin through a second path, a first resistor, coupled to the sideband use pin through the second path, a second resistor, coupled to the channel configuration pin and the sideband use pin through the first path and the second path respectively, a detection switch, coupled between the controller and the channel configuration pin and the sideband use pin through the second resistor, and the detection switch configured to receive a work voltage, and a power-supply switch, coupled to the power-output pin, and the power-supply switch configured to receive a power-supply voltage, wherein the controller is configured to control the detection switch to be turned on so that the work voltage is provided to the second resistor and the first resistor to detect a first voltage between the sideband use pin and a ground terminal and detect a second voltage between the channel configuration pin and the ground terminal, wherein the controller is configured to turn on or turn off the power-supply switch according to the first voltage and the second voltage to control whether the power-supply voltage is transmitted to the power-output pin.

2. The power supply as claimed in claim 1, wherein when the first voltage is less than a first lower threshold value, the controller is configured to turn off the power-supply switch so that the power-supply voltage cannot be transmitted to the power-output pin; when the first voltage is greater than the first lower threshold value, the controller is configured to turn on the power-supply switch so that the power-supply voltage is transmitted to the power-output pin.

3. The power supply as claimed in claim 1, wherein when the second voltage is less than a second lower threshold value, the controller is configured to turn off the power-supply switch so that the power-supply voltage cannot be transmitted to the power-output pin; when the second voltage is greater than the second lower threshold value, the controller is configured to turn on the power-supply switch so that the power-supply voltage is transmitted to the power-output pin.

4. The power supply as claimed in claim 2, wherein when a liquid having an equivalent resistance is attached on the sideband use pin, the first voltage acquired by dividing the work voltage according to the equivalent resistance, the first resistor, and the second resistor is less than the first lower threshold value.

5. The power supply as claimed in claim 4, wherein the first resistor and the equivalent resistance are connected in parallel to form a parallel-connected resistance, and the parallel-connected resistance and the second resistor are connected in series, wherein the first voltage is a voltage acquired by dividing the work voltage on the parallel-connection resistance.

6. The power supply as claimed in claim 3, wherein when a liquid having an equivalent resistance is attached on the channel configuration pin, the second voltage acquired by dividing the work voltage according to the equivalent resistance and the second resistor is less than the second lower threshold value.

7. The power supply as claimed in claim 6, wherein the second resistor and the equivalent resistance are connected in series, wherein the second voltage is a voltage acquired by dividing the work voltage on the equivalent resistance.

8. The power supply as claimed in claim 1, wherein the controller is configured to provide a detection control signal with a turned-on period and a turned-off period within a time interval to control the detection switch; during the turned-on period, the controller detects the first voltage and the second voltage once each; during the turned-off period, the controller does not detect the first voltage and the second voltage.

9. The power supply as claimed in claim 1, where when a liquid is attached on the sideband use pin or the channel configuration pin, the controller is configured to provide a detection control signal with a plurality of alternating turned-on periods and turned-off periods within a time interval to control the detection switch; during each turned-on period, the controller detects the first voltage and the second voltage once each; during each turned-off period, the controller does not detect the first voltage and the second voltage.

10. A power supply device, comprising:

a Type-C connection port, comprising a channel configuration pin, a sideband use pin, and a power-output pin, a controller, coupled to the channel configuration pin through a first path, and coupled to the sideband use pin through a second path, a first resistor, coupled to the sideband use pin through the second path, a second resistor, coupled to the channel configuration pin and the sideband use pin through the first path and the second path respectively, a detection switch, coupled between the controller and the channel configuration pin and the sideband use pin through the second resistor, and the detection switch configured to receive a work voltage, and a power-supply switch, coupled to the power-output pin, and the power-supply switch configured to receive a power-supply voltage, wherein based on the power supply device being in a first operating state, the controller is configured to control the detection switch to be turned on so that the work voltage is provided to the second resistor and the first resistor to detect a first voltage and a second voltage; the controller is configured to turn on or turn off the power-supply switch according to the first voltage and the second voltage to control whether the power-supply voltage is transmitted to the power-output pin, wherein based on the power supply device being in a second operating state, the controller is configured to output a detection current through the channel configuration pin, and acquire a detection voltage on the channel configuration pin; when the controller detects that the detection voltage exists, the controller is configured to control the power-supply switch to be turned on to detect the first voltage and the second voltage; the controller is configured to turn on or turn off the power-supply switch according to the first voltage or the second voltage to control whether the power-supply voltage is transmitted to the power-output pin, wherein the first voltage is a voltage between the sideband use pin and a ground terminal, and the second voltage is a voltage between the channel configuration pin and the ground terminal.

11. The power supply as claimed in claim 10, wherein based on the power supply device being in the first operating state, when a liquid having an equivalent resistance is attached on the sideband use pin, the first voltage acquired by dividing the work voltage according to the equivalent resistance, the first resistor, and the second resistor is less than a first lower threshold value, wherein the first resistor and the equivalent resistance are connected in parallel to form a parallel-connected resistance, and the parallel-connected resistance and the second resistor are connected in series, wherein the first voltage is a voltage acquired by dividing the work voltage on the parallel-connection resistance.

12. The power supply as claimed in claim 10, wherein based on the power supply device being in the first operating state, when a liquid having an equivalent resistance is attached on the channel configuration pin, the second voltage acquired by dividing the work voltage according to the equivalent resistance and the second resistor is less than a second lower threshold value, wherein the second resistor and the equivalent resistance are connected in series, wherein the second voltage is a voltage acquired by dividing the work voltage on the equivalent resistance.

13. The power supply as claimed in claim 10, wherein based on the power supply device being in the second operating state, when a liquid having an equivalent resistance is attached on the sideband use pin, the first voltage acquired by dividing the power-supply voltage according to an equivalent resistance and the first resistor is greater than a first upper threshold value, wherein the equivalent resistance and the first resistor are connected in series, wherein the first voltage is a voltage acquired by dividing the power-supply voltage on the first resistor.

14. The power supply as claimed in claim 10, wherein based on the power supply device being in the second operating state, when a liquid having an equivalent resistance is attached on the channel configuration pin, the second voltage acquired by dividing the power-supply voltage is greater than a second upper threshold value.

15. The power supply as claimed in claim 13, wherein based on the power supply device being in the second operating state and the liquid attached on the sideband use pin or the channel configuration pin is removed, the power supply device is changed from the original second operating state to the first operating state, and then the power supply device is returned to the second operating state again.

16. The power supply as claimed in claim 14, wherein based on the power supply device being in the second operating state and the liquid attached on the sideband use pin or the channel configuration pin is removed, the power supply device is changed from the original second operating state to the first operating state, and then the power supply device is returned to the second operating state again.

* * * * *